May 20, 1947.　　　D. H. BROWNELL　　　2,420,858
COUPLING
Filed May 20, 1944　　　2 Sheets-Sheet 1

INVENTOR.
DEAN H. BROWNELL
BY Kwis Hudson Boughton & Williams
ATTORNEYS

May 20, 1947. D. H. BROWNELL 2,420,858
COUPLING
Filed May 20, 1944 2 Sheets-Sheet 2

INVENTOR.
DEAN H. BROWNELL
BY
Kwis Hudson Boughton & Williams
ATTORNEYS

Patented May 20, 1947

2,420,858

UNITED STATES PATENT OFFICE 2,420,858

COUPLING

Dean H. Brownell, Rocky River, Ohio

Application May 20, 1944, Serial No. 536,480

9 Claims. (Cl. 285—174)

This invention relates to couplings or fittings for tubes, conduits and the like and aims to provide a novel form of coupling which can be quickly and easily applied to the tube or conduit without requiring any threaded connections or soldered joints, and which is small and compact so as to permit a plurality of conduit connections to be located in a row in relatively closely spaced relation to each other.

Another object of this invention is to provide a novel form of coupling or the like having a conduit-receiving sleeve carrying a snap-action means for connecting the coupling with the conduit.

Still another object of this invention is to provide a novel form of coupling or the like embodying an expansible resilient sleeve having internal locking means thereon for connecting the coupling with a conduit-end.

A further object of the present invention is to provide a novel coupling of the character mentioned in which the conduit-end is flared and carries a gland and a packing, and in which the conduit-receiving sleeve of the coupling has resilient locking means thereon for snap engagement with such gland.

Other objects and advantages of the invention will be apparent from the following description when taken in conjunction with the accompanying sheets of drawings in which, Fig. 1 is a side view of the coupling embodying the present invention and showing the coupling applied to the end of a tube or conduit;

Figure 1:
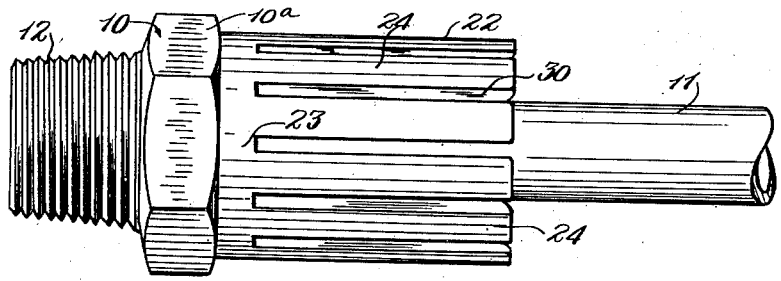
Figure 3:
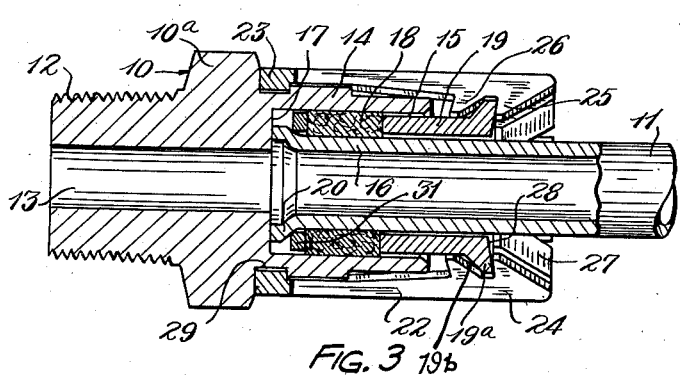
Fig. 3 is a longitudinal sectional view taken through the coupling substantially on line 3—3 of Fig. 2.
Figure 2:
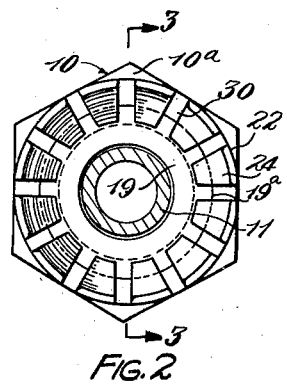
Fig. 2 is an end view of the coupling.

In the form of the invention illustrated in Figs. 1 to 3 inclusive, I show my coupling 10 applied to a tube or conduit 11 and having an externally threaded portion 12 adapted to be screwed into an opening of a body or device to which the conduit 11 is to be connected. The body 10a of the coupling has a fluid passage 13 extending therethrough and is also provided with a projecting sleeve 14 containing a recess or stuffing-box 15 into which the end portion 16 of the conduit 11 extends. The recess 15 communicates with the passage 13, but is of a larger size or diameter and the inner end of the recess provides a transverse wall or shoulder 17 against which the end of the conduit 11 abuts.

A packing ring 18, of suitable material, is located between the conduit and the sleeve 14 so as to lie in the recess 15. A gland 19 in the form of a sleeve having a head or flange 19a at its outer end extends into the recess 15 and engages the packing ring 18 to subject the latter to compression for forming a fluid-tight seal around the conduit.

As shown in the drawings, the packing ring 18 and the gland 19 are carried by the conduit 11 and are retained thereon by providing the inner end of the conduit with an enlargement or flared portion 20. The conduit-end 16, with the packing ring and gland thereon, is inserted into the sleeve 14 of the coupling so as to bring the flared end 20 into the abutting relation with the transverse shoulder 17.

For connecting the conduit-end with the coupling 10, I provide the latter with an outer sleeve 22 which is adapted for locking cooperation with the gland 19. The sleeve 22 is an expansible sleeve comprising a ring portion 23 and an annular series of axially extending resilient fingers 24, connected with such ring portion and projecting axially beyond the end of the inner sleeve 14. The resilient fingers 24 are provided adjacent their outer ends with axially spaced internal locking projections or lugs 25 and 26 which are shaped for snap engagement with the flange or head 19a on the outer end of the gland 19.

In attaching the coupling 10 to the conduit 11, the flared conduit-end 16 is inserted into the inner sleeve 14 through the open outer end of the resilient sleeve 22, as mentioned above. By means of a suitable tool, the gland 19 is pushed along the conduit 11 and into the resilient sleeve 22 to the position shown in Fig. 3 in which the head 19a of the gland has travelled inwardly past the first row or group of locking lugs 25. This inward movement of the gland pushes the packing 18 into the recess or stuffing-box 15 and, when the gland has reached its locked position shown in Fig. 3, the packing 18 will be subjected to compression and will form a seal between the conduit and the sleeve 14 of the coupling.

As shown in the drawings, the outer end of the resilient sleeve 22 is provided with an internal chamfer 27 so as to facilitate the inward movement of the head of the gland to its locked position. The head of the gland is preferably also provided with a bevel or taper 19b which cooperates with the internal chamfer 27 during movement of the gland into the resilient sleeve. When the gland 19 is moved into the resilient sleeve 22, in the manner just explained, the locking lugs 25 spring inwardly with a snap action behind the head 19a of the gland and hold the gland in engagement with packing ring 18 and at the same time retain the conduit-end 16 in the sleeve 14 of the coupling. To prevent the outward thrust of the gland 19 from spreading the resilient fingers 24, I prefer to construct the gland so that the outer end face thereof is dished or concave as indicated at 28.

The outer sleeve 22 is connected with the body 10a of the coupling preferably by providing an annular groove 29 on such body and in which the ring portion 23 engages. The sleeve 22 can be constructed in various ways, for example, it can be in the form of an initially solid sleeve or tube in which the slots 30 are cut by means of a suitable tool so as to divide the sleeve into the resilient fingers 24, after which the slotted sleeve can be assembled on the body of the coupling by rolling or spinning the ring portion 23 into the annular groove 29. The resilient sleeve 22 can also be made from flat stock by slotting and otherwise machining the same to provide the resilient fingers 24, and then rolling the slotted stock to sleeve form around the inner sleeve 14 and welding or otherwise connecting the adjacent ends of the rolled material.

As shown in the drawings, a retaining ring or washer 31 can be provided at the inner end of the packing 18 to prevent such packing from being squeezed around the end of the conduit into the fluid passage 13. As mentioned above, the resilient sleeve 22 is preferably provided with two rows of the locking lugs 25 and 26. The inner row of lugs 26 provides a second position to which the gland 19 can be moved for subjecting the packing 18 to an additional compressive force for tightening the joint or improving the seal.

It will be seen from the novel construction above described for the coupling 10, that the conduit-end 16 can be quickly and easily connected with the coupling by simply pushing the gland 19 into the outer sleeve 22 to its locked position therein. It will be seen also that by inserting a suitable tool into the chamfered end of the resilient sleeve 22, the fingers 24 can be sprung outwardly or expanded a sufficient distance to release the gland 19 whereupon the conduit-end 16, with the gland and packing thereon, can be withdrawn from the coupling. It will be seen also that my novel coupling is small and compact and that since no threaded connections are employed, it is not necessary to provide clearance space for a wrench adjacent the coupling and, therefore, conduits using my novel coupling can be arranged in rows or groups in relatively closely spaced relation to each other.

Figure 4:
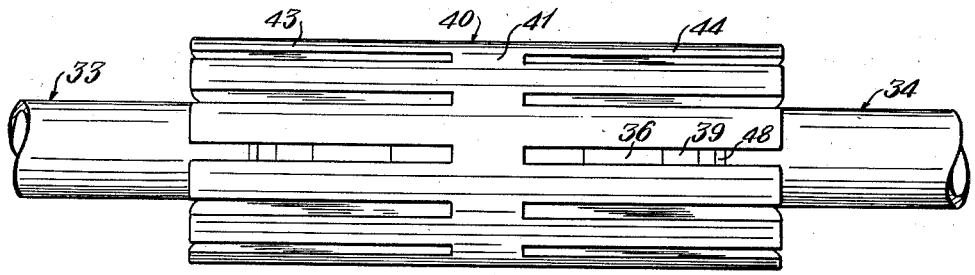
Fig. 4 is a side elevation showing another form of my novel coupling.
Figure 6:
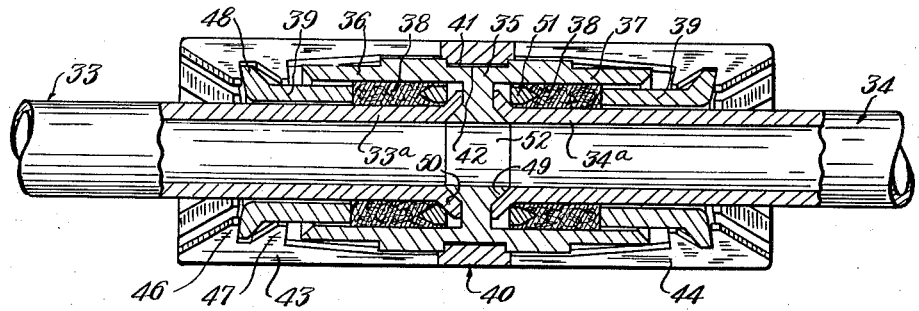
Fig. 6 is a longitudinal sectional view taken through the modified coupling substantially on line 6—6 of Fig. 5.
Figure 5:
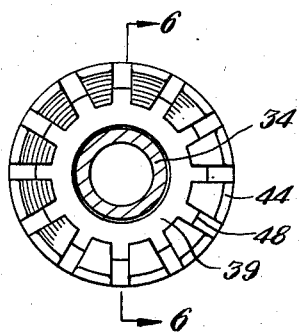
Fig. 5 is an end view of the modified form of coupling.

In Figs. 4, 5, and 6, I show a modified form of my coupling which is used for connecting a pair of tubes or conduits 33 and 34. This modified form of coupling comprises a body 35 having outwardly or oppositely projecting sleeve portions 36 and 37 adapted to receive the flared conduit-ends 33a and 34a, each of which carries a packing ring 38 and a gland 39. The coupling also includes an outer sleeve 40 having a ring portion 41 engaging in an annular groove 42 for connecting such outer sleeve with the body 35. The outer sleeve 40 has outwardly projecting resilient portions 43 and 44, which cooperate with the glands 39 for connecting the conduit-ends 33a and 34a with the coupling. The resilient portions 43 and 44 are substantially identical in construction with the resilient portion of the outer sleeve 22 described above, and are provided with internal locking lugs 46 and 47 adapted for snap engagement with the flange or head 48 of the glands 39.

As shown in Fig. 6, the body 35 of the coupling can be provided with beveled or convex portions 49 against which the flared inner ends 50 of the conduits 33 and 34 abut. The packing rings 38 are preferably provided at their inner ends with a ring or insert 51, which serves as a retainer for preventing the packing from being squeezed into the passage 52 of the coupling by the pressure of the glands 39 thereagainst.

Figure 7:
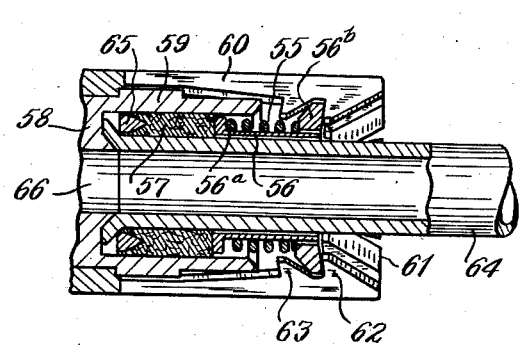
Fig. 7 is a partial longitudinal sectional view taken through still another form of my novel coupling.
Figure 8:
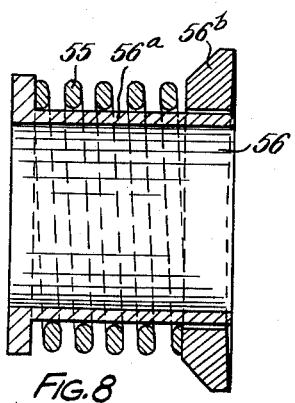
Fig. 8 is a longitudinal sectional view on an enlarged scale, showing the gland of the coupling of Fig. 7 in detached relation and with the spring thereof in a compressed condition.

In Fig. 7, I show still another form of my novel coupling, which is similar to the couplings already described above, but in which a compression spring 55 is embodied in the gland 56 so as to maintain the packing 57 continuously under compression.

In the modified construction of Fig. 7, the coupling 58 is provided with inner and outer sleeves 59 and 60, such as those above described for the couplings of Figs. 3 and 6, and the resilient fingers 61 of the outer sleeve 60 are provided with internal locking lugs 62 and 63.

The gland 56 comprises a sleeve portion 56a, and a head or flange portion 56b with which the locking means of the resilient fingers 61 has snap engagement. The spring 55 is disposed around the sleeve portion 56a so as to continuously urge the latter inwardly against the packing 57 while the head 56b is held in locked position by the lugs 62. The compressive force exerted on the packing 57 causes the latter to maintain a seal between the conduit 64 and the sleeve 59 of the coupling. A ring or insert 65 provided at the inner end of packing 57 prevents the latter from being squeezed into the passage 66 of the coupling.

While I have illustrated and described my novel couplings in considerable detail, it will be understood, of course, that I do not wish to be correspondingly limited, but regard my invention as including all changes and modifications coming within the spirit of the invention and the scope of the appended claims.

Having thus described my invention, I claim:

1. A coupling or the like comprising a body having a conduit-receiving sleeve provided with resilient locking means, a packing in said sleeve and surrounding the conduit, and a gland in said sleeve and surrounding said conduit, said gland having a snap engagement with said resilient locking means by which it is retained in said sleeve in engagement with said packing.

2. A coupling or the like comprising a body having a sleeve portion, a conduit extending into said sleeve portion and having an enlarged inner end, a packing and a gland in said sleeve portion and retained on said conduit by said enlarged inner end, and resilient locking means on said body and adapted for snap engagement with said gland.

3. A coupling or the like comprising a body having a sleeve portion, a conduit extending into said sleeve portion and having an enlarged inner end, a packing and a gland in said sleeve portion and retained on said conduit by said enlarged inner end, and resilient means on said body and extending axially beyond said sleeve portion and provided with internal locking means adapted for snap engagement with said gland.

4. A coupling or the like comprising a body having a sleeve portion, a conduit extending into said sleeve portion and having an enlarged inner end, a packing and a gland in said sleeve portion and retained on said conduit by said enlarged inner end, a packing retaining ring surrounding said conduit and engaged by the inner end of said packing, and an expansible resilient sleeve carried by said body and surrounding said sleeve portion and provided with internal locking means adapted for snap engagement with said gland.

5. A coupling or the like comprising a body having a sleeve portion, a conduit extending into said sleeve portion and having an enlarged inner end, a packing and a gland in said sleeve portion and retained on said conduit by said enlarged inner end, said gland being axially shiftable on said conduit for movement against said packing, and an annular series of resilient fingers carried by said sleeve portion and having their outer ends projecting therebeyond, said outer ends having internal lugs thereon adapted for locking engagement with said gland.

6. A coupling or the like comprising a body having a sleeve portion, a conduit extending into said sleeve portion, a packing between the sleeve portion and conduit, a gland extending into the sleeve portion around the conduit and having a head thereon, said gland being movable along said conduit for engaging said packing, and an expansible sleeve surrounding said sleeve portion and having internal lugs thereon adapted for locking engagement with the head of said gland, said expansible sleeve having an internal chamfer at its outer end and the head of said gland having an external bevel thereon for cooperation with said chamfer for facilitating movement of said gland inwardly past said lugs.

7. A coupling or the like comprising a body having a sleeve portion, a conduit extending into said sleeve portion, a packing between the sleeve portion and conduit, a gland extending into the sleeve portion around the conduit and having a head thereon, said gland being movable along said conduit for engaging said packing, and an expansible sleeve surrounding said sleeve portion and having axially spaced annular rows of internal lugs thereon adapted for successive locking engagement with the head of said gland.

8. A coupling or the like comprising a body having a sleeve adapted to receive a conduit therein, a packing between the sleeve and conduit, a gland extending into the sleeve around the conduit, and an expansible sleeve carried by the first-mentioned sleeve and having means thereon adapted for locking engagement with said gland, said gland comprising relatively movable parts including a spring for pressing one of such parts against said packing while another of said parts is held by the locking means of said expansible sleeve.

9. A coupling or the like comprising a body having outwardly extending sleeves each adapted to receive a conduit-end therein, a packing between each sleeve and conduit, a gland extending into each sleeve, and an outer sleeve mounted on said body and having expansible locking portions extending beyond the first-mentioned sleeves and engaging the glands in the latter.

DEAN H. BROWNELL.

REFERENCES CITED

The following references are of record in the file of this patent:

UNITED STATES PATENTS

| Number | Name | Date |
|---|---|---|
| 1,697,539 | Olsson et al. | Jan. 1, 1929 |
| 770,525 | Hussey | Sept. 20, 1904 |
| 1,966,718 | Hanson | July 17, 1934 |

FOREIGN PATENTS

| Number | Country | Date |
|---|---|---|
| 187,195 | Switzerland | Jan. 2, 1937 |